United States Patent [19]

Klein

[11] Patent Number: 4,812,766

[45] Date of Patent: Mar. 14, 1989

[54] TELLURIC NOISE CANCELLATION IN INDUCED POLARIZATION PROSPECTING

[75] Inventor: James D. Klein, McKinney, Tex.

[73] Assignee: Atlantic Richfield Company, Los Angeles, Calif.

[21] Appl. No.: 115,328

[22] Filed: Nov. 2, 1987

[51] Int. Cl.4 .......................... G01V 3/02; G01V 3/08; G01V 3/38
[52] U.S. Cl. ..................................... 324/362; 324/349; 324/357
[58] Field of Search ............... 324/349, 350, 357, 362

[56] References Cited

U.S. PATENT DOCUMENTS

| | | | |
|---|---|---|---|
| 1,841,376 | 1/1932 | Nichols et al. | 324/357 |
| 2,162,087 | 6/1939 | Jakosky | 324/357 |
| 4,339,720 | 7/1982 | Halverson | 324/362 |

Primary Examiner—Gerard R. Strecker
Attorney, Agent, or Firm—Albert C. Metrailer

[57] ABSTRACT

An improved method and apparatus for detecting telluric noise information while performing induced polarization prospecting. Telluric noise electrodes are positioned on an equipotential line lying about an input current electrode forming part of a conventional IP electrode spread. The telluric noise record obtained from the noise electrodes is essentially free of IP input signal waveform.

8 Claims, 1 Drawing Sheet

TELLURIC NOISE CANCELLATION IN INDUCED POLARIZATION PROSPECTING

BACKGROUND OF THE INVENTION

The present invention relates to induced polarization prospecting and more particularly to improved apparatus and methods for removing noise components from the signals detected in induced polarization prospecting.

The basic methods and apparatus used for induced polarization (IP) mineral prospecting are well known and have been in use for many years. U.S. Pat. No. 4,339,720, issued July 13, 1982, to Halverson, illustrates such a system and is hereby incorporated by reference for all purposes. As discussed in the Halverson patent, numerous improvements have been made in IP systems to allow such systems to be effective at greater search depth. For example, current levels have been increased, electrode spread sizes have been increased, and the frequency of input signals have been reduced. It is generally accepted that the major source of noise in IP prospecting results from naturally occurring earth currents, that is telluric currents, which are detected along with the desired signals.

The improvement taught by Halverson included an electrode arrangement and an exploration method which allowed detection of the telluric noise occurring during the IP prospecting process, where the noise record included very little of the IP signal. This was achieved by using telluric noise detection electrodes spaced apart by a great distance along the prospecting path, at least 1.5 times the maximum search depth of the primary electrode spread. Even with this arrangement some portion of the telluric record was made up of the IP signal. In some cases, the telluric record needs to be corrected for the IP signal before it is in turn used to correct the primary IP records.

Thus, it is seen that it is desirable to provide records of telluric noise with such records being substantially free of induced polarization signal components. It is also desirable that such records be acquired in a simple manner and with the smallest and least complicated electrode spread possible. In addition, it is desirable that orthogonal components of telluric noise be measured so that bends in the prospecting path will not cause degradation of the telluric correction.

SUMMARY OF THE INVENTION

Accordingly, an object of the present invention is to provide an improved induced polarization electrode arrangement.

Another object of the present invention is to provide a method for detecting telluric noise occurring during an induced polarization prospecting process for generation of correction signals.

An induced polarization electrode arrangement, according to the present invention, includes a first spread of electrodes distributed along a prospecting path for transmission of induced polarization input currents and sensing of voltage signals. In addition, first and second telluric noise sensing electrodes are positioned on an equipotential line about a current input electrode. Telluric noise is recorded by use of the telluric sensing electrodes simultaneously with operation of the induced polarization electrode spread. The sensed telluric noise record is then used to correct the induced polarization signals to improve the signal-to-noise ratio of the desired signals.

BRIEF DESCRIPTION OF THE DRAWINGS

The present invention may be better understood by reading the detailed description of the preferred embodiments with reference to the accompanying drawings wherein.

DESCRIPTION OF THE PREFERRED EMBODIMENTS

Figure 1:
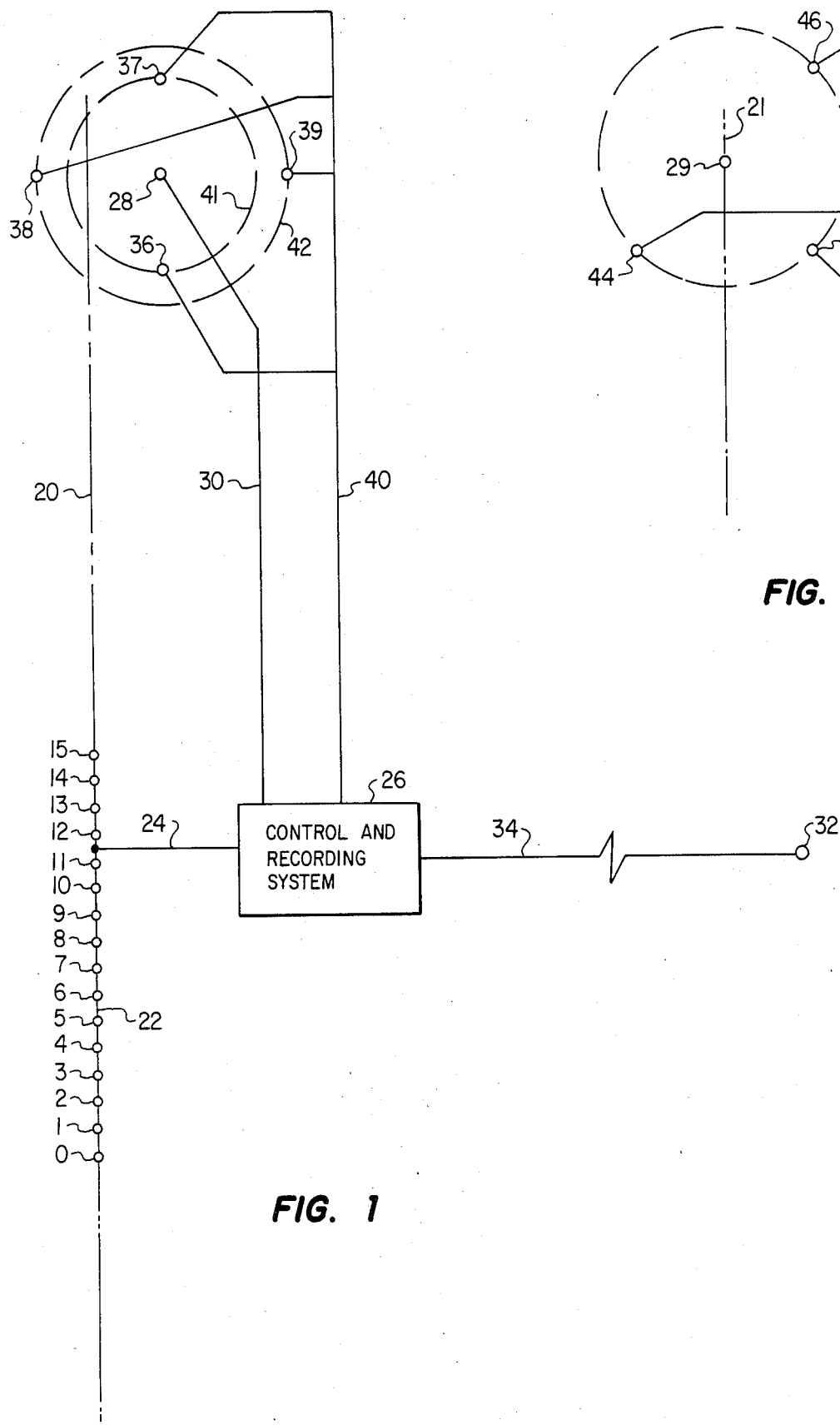
FIG. 1 is a partially schematic plan view of an induced polarization electrode spread according to the present invention.

With reference now to FIG. 1 an improved induced polarization electrode arrangement will be described. A typical prospecting path is indicated by a line 20 running from top to bottom of the figure. A somewhat conventional induced polarization electrode spread is indicated by the electrodes numbered 0 through 15. A multi-conductor seismic cable 22 is laid out along the path 20 with connectors at the locations of each of the electrodes 0 through 15. In this preferred embodiment, the take-out spacing and accordingly the spacing between the electrodes in this first spread is 500 feet. Other numbers of electrodes and other spacings, smaller or larger, may be used if desired and as conditions warrant. A multi-conductor cable 24 is connected between cable 22 and a control and recording system 26. System 26 receives and records the multiple voltages detected between adjacent pairs of electrodes 0 through 15.

The system 26, or a separate transmitter controlled by system 26, provides the input current signal used in the IP prospecting method. The electrode spread includes an input current electrode 28 which may be on the prospecting path 20, but also may be offset as illustrated. Such an offset will necessarily occur when the path 20 is not a straight line. Electrode 28 is connected to system 26 by a heavy single conductor cable 30. A return current electrode 32 is positioned a substantial distance from the other electrodes. Return electrode 32 is connected to the system 26 by another heavy single conductor cable 34. For the purposes of the present invention, return electrode 32 is considered to be positioned at infinity. As illustrated, electrode 32 may be positioned laterally displaced from the prospecting path 20. Electrode 32 may be on prospecting path 20 so long as it is positioned a great distance from the other electrodes.

Also illustrated in FIG. 1 are four telluric noise detecting electrodes 36 through 39. In FIG. 1, electrodes 36 and 37 form a telluric noise sensing dipole in alignment with the prospecting path 20. Telluric noise sensing electrodes 38 and 39 form a second telluric noise sensing dipole which is positioned orthogonal, in this case perpendicular, to the prospecting path 20. A basic system, according to the present invention, includes electrodes 36 and 37. Electrodes 38 and 39 may be used if desired and can provide additional information relating to the direction as well as the amplitude of the telluric currents. Electrodes 36 through 39 are connected by means of a multi-conductor cable 40 to the control and recording system 26 where the telluric records are recorded along with the IP signals received from electrodes 0 through 15 during the prospecting process.

In the preferred embodiment all four electrodes 36–39 are used. In this case the two dipoles, i.e. electrodes 36 and 37 and electrodes 38 and 39, should be orthogonal, but it is not essential for either dipole to actually be positioned parallel to path 20. If only one dipole is used, e.g. electrodes 36 and 37, then the dipole should be parallel to path 20.

The use of an orthogonal pair of telluric electrodes, e.g. 36–37 and 38–39, is especially useful when path 20 is not a straight line. In such case it is not possible for a single dipole to be parallel to all signal dipoles on the prospecting path. The telluric noise direction information derived from the orthogonal pair arrangement allows determination of the appropriate telluric noise correction for each signal dipole along the path.

In FIG. 1 there are also illustrated two equipotential lines about input current electrode 28 in the form of circles 41, 42. By an equipotential line it is meant that voltages measured along, for example, line 42 which result from injection of current into the earth through input electrode 28 should all be identical. Therefore, voltages measured between any two electrodes positioned on line 42 should result from some electrical source other than the current injected through electrode 28. Since electrodes 36 and 37 and electrodes 38 and 39 are positioned on the equipotential lines 41 and 42 respectively, voltages measured at the dipoles 36–37 and 38–39 should, therefore, represent telluric noise and should be free of the IP waveform even when measured simultaneously with operation of the conventional IP process.

The representation of the equipotential lines 41, 42 as perfect circles is based on two assumptions. The first is that the return electrode 32 is sufficiently far away so that it is effectively at infinity. In addition, it is based on the assumption that the resistivity of the earth is uniform. Good experimental results have been achieved by making these two assumptions and placing the electrodes 36 through 39 at equal distances from the input current electrode 28. Thus, in a small scale test where the current dipole, that is distance between electrodes 28 and 32 was only 2500 feet, good results were achieved when electrodes 36 and 37 were positioned as far as 1000 feet from the current electrode 28. Thus, it appears that good results can be achieved by placing telluric noise detecting electrodes 36 through 39 on geometric circles centered on the input current electrode 28 even when the radius is as large as about one-half of the distance between electrodes 28 and 32. However, in general it is recommended that a smaller ratio between the distances be used. Thus, it may be desirable for the distance between current electrode 28 and telluric noise sensing electrodes 36 through 39 to be as small as 1/20th of the distance between current electrodes 28 and 32.

In general, the electrode spread is simplified by having the telluric noise sensing electrodes 36 through 39 positioned as close as possible to input electrode 28. However, there are certain limitations on the minimum distance. For example, surface current density (rate of change of electric field) increases as electrode 28 is approached. Absolute distance errors in measurement of the distance between electrode 28 and electrodes 36 through 39 become more significant on a percentage basis as the spacing becomes smaller. Such inaccuracies cause some portion of the IP signal to be recorded by the dipoles 36–37 and 38–39.

As illustrated in FIG. 1, it is not necessary that all four electrodes 36–39 forming an orthogonal pair of dipoles be on the same equipotential path 41 or 42. Due to obstructions or other physical limitations of a given survey area, it may be necessary that each telluric dipole have a different length as illustrated. This arrangement may also result from the practical consideration that a precise land survey of the geometric circles may be difficult. In such case it may be easier to use the IP system to perform an electrical survey of the equipotentials. This involves injecting a standard IP waveform using electrode 28 while monitoring, for example, dipole 38, 39 for the IP waveform. One of the electrodes 38 or 39 is then moved closer to and farther from electrode 28 in measured steps until the equipotential point is identified by a minimum in the detected IP waveform.

Figure 2:
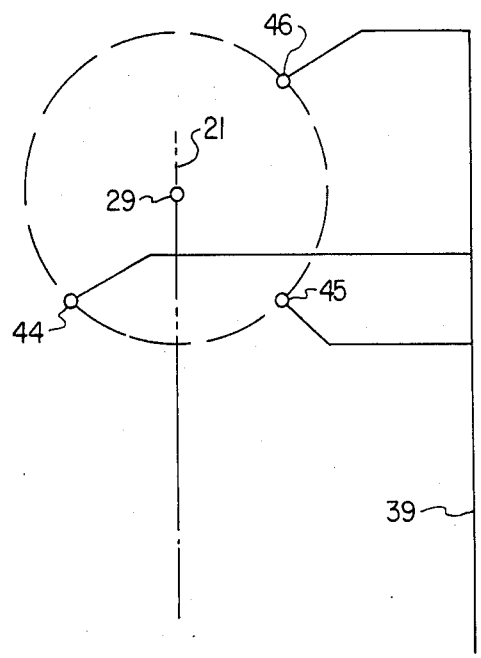
FIG. 2 is a plan view of an alternative arrangement of telluric noise sensing electrodes according to the present invention.

With reference to FIG. 2 an alternate and simplified telluric noise sensing electrode arrangement will be described. In FIG. 2 a prospecting path 21 and input current electrode 29 are equivalent to elements 20 and 28, illustrated in FIG. 1. However, in FIG. 2 only three telluric noise electrodes 44, 45, and 46 are illustrated. These three electrodes 44 through 46 provide both in-line and orthogonal telluric noise dipoles and therefore provide the same noise information as the electrodes 36 through 39 that FIG. 1 can provide. Thus, electrodes 45 and 46 form a telluric noise sensing dipole in alignment with the prospecting path 21. Telluric noise sensing electrodes 44 and 45 form a orthogonal dipole. All of the electrodes 44 through 46 lie on an equipotential line about input current 29. Well known electrical engineering signal techniques can be used in system 26 to separate the in-line and orthogonal components of telluric noise detected by electrodes 44 through 46 even though electrode 45 is common to both dipoles.

Operation of the induced polarization method using the equipment according to the present invention is basically conventional. That is, an electrode spread and a control and recording system as illustrated in FIG. 1 is positioned on the earth's surface. Alternatively, the telluric noise electrode arrangement of FIG. 2 may be used. As a minimum, two telluric noise electrodes positioned on an equipotential line such as 41 are required. A conventional IP input signal is applied to the earth by means of electrodes 28 and 32. The IP voltage signals are detected by electrodes 0 through 15 and recorded in system 26. Simultaneously, a record of telluric noise is detected by the telluric noise electrodes positioned on at least one equipotential line about input electrode 28. The noise record is recorded by system 26 along with the voltage signals from electrodes 0 through 15. The recorded signals are then used to generate conventional IP records which are free of telluric noise. Correction techniques such as those discussed in the Halverson patent may be used.

As discussed above, the representation of equipotential lines 41 and 42 as perfect circles is based on various assumptions concerning uniformity of earth resistivity and the effective distance to the return current electrode 32. The equipotential line which has been discussed to this point is the equipotential based upon the input current signal. A second type of equipotential may be identified with reference to the induced polarization decay signal which occurs after injection of the input current. Since it is the decay signal time period which contains the desired information, it was thought that the difference may be of significance. However, experimental results indicate that the two types of equipotentials can have essentially the same shape, that is circles, centered on the input current electrode 28. As a result, in those experiments there was no real point in attempting to identify precisely the decay current equipotentials. In more geologically complex areas it may be desirable to locate the decay current equipotentials using an electrical survey.

While the present invention has been illustrated and described with reference to specific apparatus and specific methods of operation, it is apparent that various modifications and changes may be made therein within the scope of the appended claims.

What is claimed is:

1. A method of providing an indication of direction and amplitude of a telluric noise component of induced polarization signals, with said indication being substantially free of induced polarization signals comprising:
   positioning first and second telluric noise sensing electrodes on the earth's surface on an equipotential line located about a current electrode which forms part of an induced polarization electrode spread;
   positioning at least one additional electrode on said equipotential line;
   detecting telluric noise by means of said first and second noise sensing electrodes simultaneously with detection of induced polarization signals by means of said spread; and detecting telluric noise by means of said at least one additional electrode in a direction orthogonal to the dipole formed by said first and second electrodes.

2. The method of claim 1 wherein said first, second and at least one additional noise sensing electrodes are positioned at equal distances from the current electrode.

3. Improved induced polarization prospecting apparatus including:
   a plurality of induced polarization electrodes distributed along a prospecting path on the earth's surface forming a plurality of induced polarization sensing dipoles;
   means coupled to said plurality of induced polarization sensing dipoles for detecting induced polarization signals;
   a current input electrode positioned on the earth's surface;
   first and second telluric noise sensing electrodes positioned on the earth's surface on equipotential line located about said current input electrode;
   at least one additional telluric noise sensing electrode positioned on said equipotential line so as to sense telluric noise in a direction orthogonal to the dipole formed by said first and second electrodes; and
   means coupled to said first, second and at least one additional telluric noise sensing electrodes for detecting direction and amplitude of telluric noise.

4. Apparatus according to claim 3 wherein said noise sensing electrodes are positioned at equal distances from said current input electrode.

5. Improved induced polarization prospecting apparatus including:
   a plurality of induced polarization electrodes distributed along a prospecting path on the earth's surface forming a plurality of induced polarization sensing dipoles;
   means coupled to said plurality of induced polarization sensing dipoles for detecting induced polarization signals;
   a current input electrode positioned on the earth's surface;
   first and second telluric noise sensing electrodes positioned on the earth's surface on an equipotential line located about said current input electrode and forming a first dipole;
   third and fourth telluric noise sensing electrodes forming a second dipole positioned orthogonal to said first dipole and positioned on an equipotential line located about said current input electrode; and
   means coupled to said first, second, third and fourth telluric noise sensing electrodes for detecting direction and amplitude of telluric noise.

6. Apparatus according to claim 5 wherein said first, second, third and fourth noise sensing electrodes are positioned at equal distances from said current input electrode.

7. A method of providing an indication of direction and amplitude of a telluric noise component of induced polarization signals, with said indication being substantially free of induced polarization signals comprising:
   positioning first and second telluric noise sensing electrode on the earth's surface on an equipotential line located about a current electrode which forms part of an induced polarization electrode spread, said first and second electrodes forming a first dipole;
   positioning third and fourth telluric noise sensing electrodes on an equipotential line located about said current electrode, said third and fourth electrodes positioned to form a second dipole orthogonal to said first dipole; and
   detecting telluric noise by means of said first and second dipoles simultaneously with detection of induced polarization signals by means of said spread.

8. The method of claim 7 wherein said noise sensing electrodes are positioned at equal distances from the current electrode.

* * * * *